(12) United States Patent
McKill

(10) Patent No.: US 6,722,444 B2
(45) Date of Patent: Apr. 20, 2004

(54) ROTARY HAND-HELD TILLING AND WEED REMOVING DEVICE

(75) Inventor: Robert McKill, Dundalk (CA)

(73) Assignee: Roto-Majic Inc., Dundalk (CA)

( * ) Notice: Subject to any disclaimer, the term of this patent is extended or adjusted under 35 U.S.C. 154(b) by 3 days.

(21) Appl. No.: 09/962,293

(22) Filed: Sep. 26, 2001

(65) Prior Publication Data

US 2003/0066663 A1 Apr. 10, 2003

(30) Foreign Application Priority Data

Jul. 27, 2001 (CA) ............................................... 2353105

(51) Int. Cl.[7] ............................................... A01B 33/00
(52) U.S. Cl. ............................. 172/41; 172/25; 172/111
(58) Field of Search ........................... 172/42, 41, 35, 172/378, 371, 111, 329; 175/421, 397; 30/299, 302, 303, 305, 500

(56) References Cited

U.S. PATENT DOCUMENTS

| | | | |
|---|---|---|---|
| 2,082,476 A | | 6/1937 | Allen |
| 2,779,259 A | * | 1/1957 | Kelsey ........................ 172/111 |
| 2,975,848 A | | 3/1961 | Roberts |
| 2,991,838 A | * | 7/1961 | Lane .......................... 172/111 |
| 3,129,771 A | * | 4/1964 | Lidstone ...................... 172/111 |
| 3,444,934 A | * | 5/1969 | Alberto ........................ 172/25 |
| 4,049,059 A | | 9/1977 | Weibling |
| D247,899 S | | 5/1978 | Underwood |
| D252,879 S | | 9/1979 | Lessig, III et al. |
| 4,213,504 A | | 7/1980 | Schneider |
| 4,282,943 A | * | 8/1981 | Leitner ........................ 172/22 |
| 4,293,041 A | | 10/1981 | Holmstadt et al. |
| 4,305,470 A | * | 12/1981 | Anderson ..................... 172/41 |
| 4,511,004 A | * | 4/1985 | Deneen ........................ 172/21 |
| 4,618,003 A | | 10/1986 | Hostetter |
| 4,723,802 A | * | 2/1988 | Fambrough ................... 172/25 |
| 4,791,995 A | | 12/1988 | Hochlan, Jr. |
| 4,807,710 A | * | 2/1989 | Greeley ....................... 172/111 |
| 4,819,736 A | | 4/1989 | Hedgepeth |
| 4,905,768 A | | 3/1990 | Lorenz |
| 4,986,368 A | * | 1/1991 | Underwood et al. .......... 111/14 |
| 5,133,269 A | * | 7/1992 | Charneski .................... 111/116 |
| 5,261,496 A | | 11/1993 | Smotherman |
| 5,330,010 A | | 7/1994 | Smotherman |
| 5,435,396 A | | 7/1995 | Robichaux |
| 5,441,118 A | | 8/1995 | Cruz, Jr. |
| 5,452,767 A | * | 9/1995 | Smotherman ................ 172/25 |
| 5,564,353 A | | 10/1996 | Wade et al. |
| 5,706,900 A | | 1/1998 | Liao |
| 5,709,273 A | | 1/1998 | Roth |
| 5,740,869 A | | 4/1998 | Sandholzer |
| 5,810,093 A | * | 9/1998 | Howard ...................... 172/111 |
| 5,813,471 A | | 9/1998 | Ramsey |
| 5,850,882 A | | 12/1998 | Link |
| 5,865,259 A | | 2/1999 | Catto |
| 5,870,827 A | * | 2/1999 | Holst .......................... 30/122 |
| 5,909,778 A | | 6/1999 | Acosta et al. |
| 5,988,292 A | * | 11/1999 | Knotts ......................... 172/25 |
| 6,032,442 A | | 3/2000 | Paolo |
| 6,050,344 A | * | 4/2000 | Larson et al. ................. 172/25 |
| 6,062,318 A | | 5/2000 | Andrews |
| 6,189,627 B1 | | 2/2001 | Marshall et al. |
| 6,227,317 B1 | | 5/2001 | Severns |
| 6,257,346 B1 | | 7/2001 | Schofield et al. |
| 6,352,122 B1 | * | 3/2002 | Love .......................... 172/22 |

FOREIGN PATENT DOCUMENTS

| | | |
|---|---|---|
| FR | 2410422 | 6/1979 |
| FR | 2558331 | 7/1985 |
| WO | WO 96/06522 | 3/1996 |

* cited by examiner

*Primary Examiner*—Victor Batson
(74) *Attorney, Agent, or Firm*—Ridout & Maybee LLP

(57) ABSTRACT

A rotary hand-held tilling and weed removing device comprises a shaft; a "T" shaped handle and two lock collars and is attachable to the chuck of a power drill. The shaft is provided with rotary arms which allow tilling and weed removal in very confined areas and precision control from the shaft handle adds to the ease of use. This gardening tool has a simple design and does not require blade or tiller bar replacement making it very cost effective.

15 Claims, 2 Drawing Sheets

ROTARY HAND-HELD TILLING AND WEED REMOVING DEVICE

BACKGROUND OF THE INVENTION

References Cited: U.S. Paten Documents

| | |
|---|---|
| 6,227,317 | May 2001 Severns |
| 5,988,292 | November 1999 Knotts |
| 5,865,259 | February 1999 Catto |
| 5,810,093 | September 1998 Howard |
| 4,819,736 | April 1989 Hedgepeth |
| 3,129,771 | April 1964 Lidstone |
| 6,050,344 | April 2000 Larson, et al. |
| 5,909,778 | June 1999 Acosta, et al |
| 5,850,882 | December 1998 Link |
| 5,564,353 | October 1996 Wade, et al |
| 4,723,802 | February 1988 Fambrough |

This invention relates to a multi-purpose gardening device consisting of a one-piece shaft with a control handle. One end attaches to a power drill chuck, the other end, prongs, will do the tilling and weed removal. The simplicity of design allows ease of use and virtualy no maintenance. Cultivation of garden plants in close proximity is highly possible with the ROTO-MAJIC gardening tool.

In the past, powered garden tools have been very complicated and expensive by design, not to mention bulky or heavy. These devices had gas powered engines or self contained electircal motors that require fuel or hydro from other sources. Today's newer battery powered hand drills make it easier to power garden tools. This invention was designed to give the user variety in garden maintenace labour and a significant economic benefit. Previous garden tool attachments have been implemented for a specific application, therefore, start one gardening job—stop and change a blade or tool to the shaft—on to the next application.

According to this invention all other inventions are over engineered, costly and complicated. A significant disadvantage of previous garden tools is that the shaft is contained in a sleeve and parts are welded or screwed to the end of the shaft, this results in high cost of manufacturing and more chanches of breakage or malfunction.

The diverse functions of this invention does not limit the user to a certain project in the garden, it could be random flowers or vegitable rows. Roto-Majic will roto-till, aerate, mulch and weed in close proximity to all plants, walls and borders. The objectives and advantage of this tool are set forth in the summary to follow.

SUMMARY OF THE INVENTION

The gardening tool invention comprise of a ⅜ inch. steel shaft 36 inches in length, split and bent in a triangular direction. The simplicity of this invention does not require any attachments. The control handle is adjustable to the user's height and arm length. Once the user becomes familar with the tool (on average, about one hour) it will become obvious how easy this invention will work. The availability of a gardening tool compatible with a hand-held drill has not been accessable at a reasonable cost. This simple, light weight, one tool does all, will cut down on the time the user will require to do gardening maintenance.

DETAILED DESCRIPTION OF THE INVENTION

Figure 1:
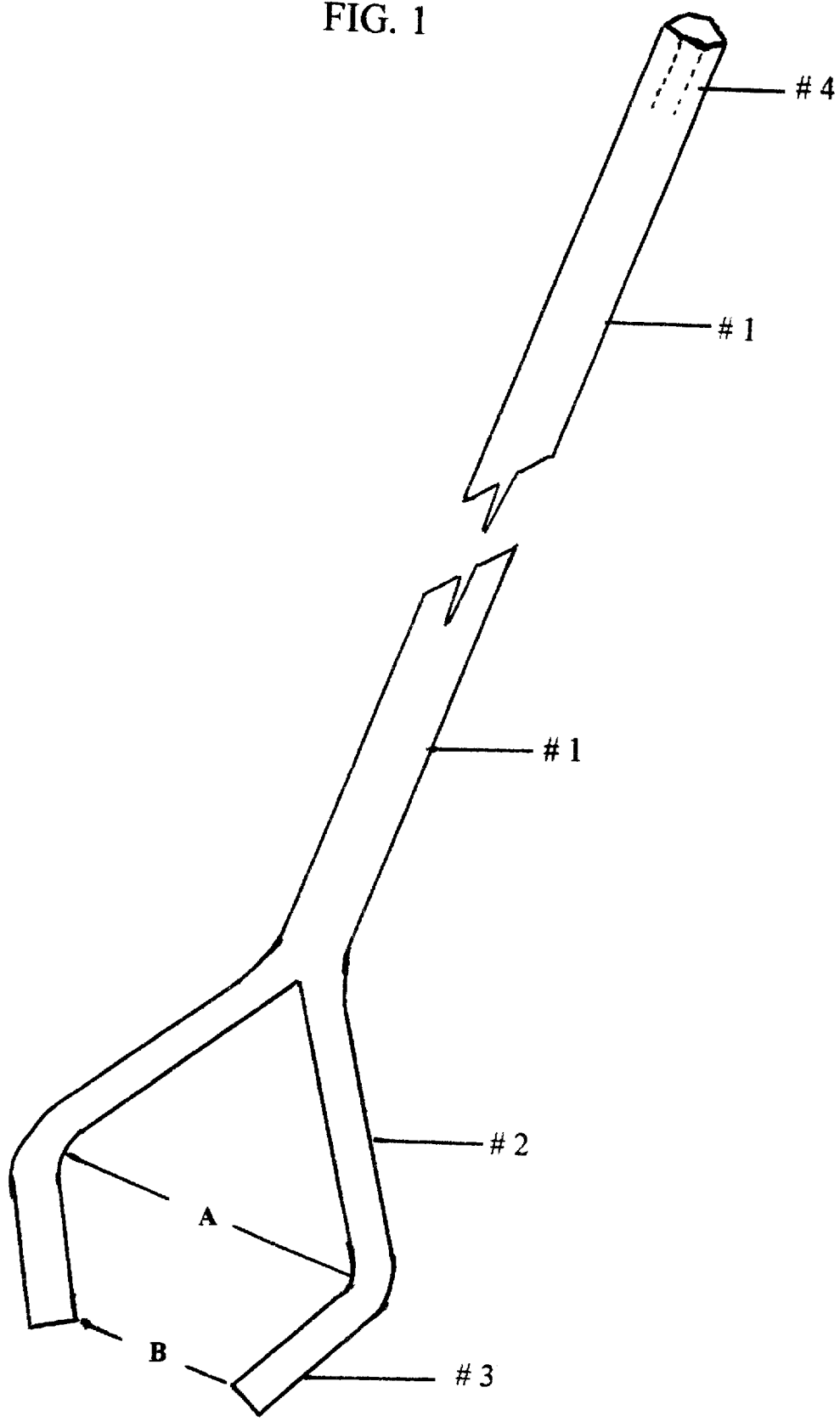
FIG. 1. A split length view of the steel shaft with one end divided and the prongs bent to a specific angle.

The ROTO-MAJIC gardening tool in FIG. 1 is a steel shaft #1 ⅜ inch in diameter and 35¾ inches in length. The lower end #2 has been split 3 inches up the centre of the shaft, the split has been configured to form 2 prongs #3. The outside edges of the prongs #3 are half rounded while the inside edge is flat. The outside edges #3 are opened to the width of 2½ inches "A" at 2 inches from the inner split of the shaft #1. The outer end of the prongs #3 are tapered inward to 1 inch "B" apart to acquire the specific desired shape.

The upper end #4 stamped or machined 1 inch down the shaft to form three flat sides for easy nonslip attachment to the chuck of a ⅜ inch power rotary drill.

Figure 2:
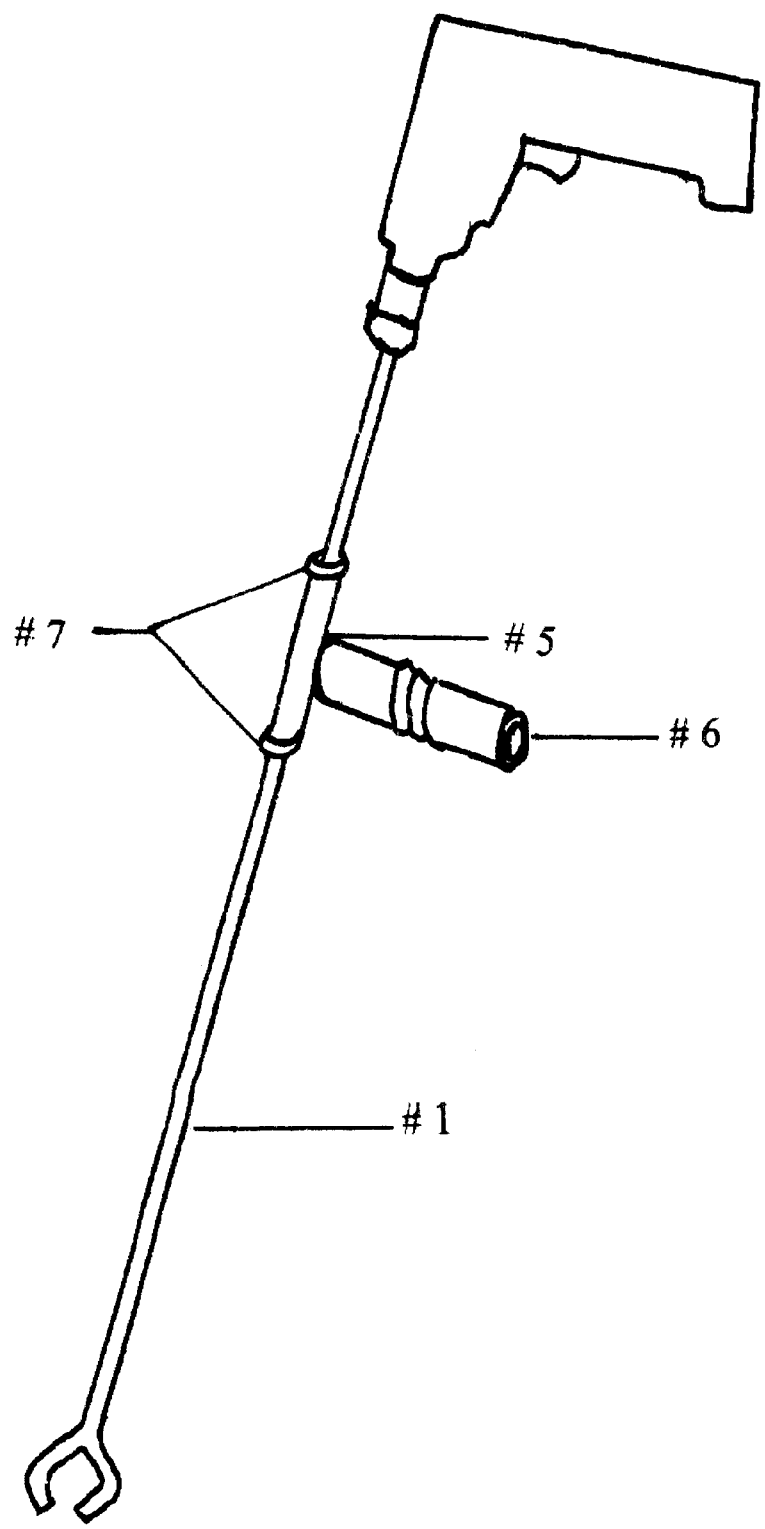
FIG. 2. A full length view of the steel shaft with the control handle attached and the upper end inserted into the chuck of a rotary drill.

In FIG. 2, the ROTO-MAJIC gardening tool #1 deplicts the nylon 'T' shape handle #5. The shaft #1 rotates freely inside the verticle part of the handle #5 while the horizontal part of the handle #5 is held by the user. The horizontal part of the handle #5 has a foam-rubber handle grip #6 for control and comfort. The adjustable 'T' shaped handle #5 is locked in place by two lock collars #7. These lock collars may be loosened with an Allen Key and adjusted to the user's desired position of the nylon 'T' shape handle.

What is claimed is:

1. A rotary hand-held tilling and weed removing device, comprising:
   (a) a rotatable shaft having an upper end and a lower end, the upper end being rotatably attachable to a chuck of a rotary power drill; and
   (b) a pair of prongs provided on the lower end of the shaft, the prongs being coplanar with the shaft and having an angular shape, wherein each prong has an upper portion, a central portion and a lower portion, with the upper portions of both prongs extending downwardly from the lower end of the shaft and outwardly away from one another toward the central portion, the lower portions of the prongs extending downwardly from the central portion and inwardly toward one another, the lower portions each having a tip distal from the central portion such that a distance between the central portions is greater than a distance between the distal tips, and wherein the lower end of the shaft terminates at the upper portions of the prongs.

2. The rotary hand-held tilling and weed removing device according to claim 1, wherein each of the prongs has a length of about 3 inches measured along the prong from the distal tip to the lower end of the shaft.

3. The rotary hand-held tilling and weed removing device according to claim 1, the prongs each have a semi-circular cross-section along their entire length, such that each prong has a half-rounded outward-facing surface along its entire length and a flat inward-facing surface along its entire length.

4. The rotary hand-held tilling and weed removing device according to claim 3, wherein the semi-circular cross section of the prongs is configured to correspond in shape and in area to a cross-section of the shaft split along its center.

5. The rotary hand-held tilling and weed removing device according to claim 1, wherein the distance between the central portions of the prongs is 2.5 inches.

6. The rotary hand-held tilling and weed removing device according to claim 1, wherein the distance between the distal tips of the lower portions of the prongs is 1 inch.

7. The rotary hand-held tilling and weed removing device according to claim 1, wherein the angular shape of each prong comprises a V-shape, with the central portion of each prong comprising an apex of the V-shape, such that the distance between the central portions comprises a maximum distance between the prongs.

8. The rotary hand-held tilling and weed removing device according to claim 7, wherein a distance between the upper portions of the prongs increases continuously between the lower end of the shaft and the central portions of the prongs; and wherein a distance between the lower portions of the prongs decreases continuously between the central portions of the prongs and the distal tips of the lower portions.

9. The rotary hand-held tilling and weed removing device according to claim 8, wherein the upper portions and lower portions of the prongs are straight.

10. The rotary hand-held tilling and weed removing device according to claim 1, further comprising:

(c) a control handle comprising a first portion extending along the shaft, and a second portion extending from the first portion, wherein the shaft is received inside the first portion and is freely rotatable therein, and wherein the second portion is provided with a handle grip.

11. The rotary hand-held tilling and weed removing device according to claim 10, wherein the handle is T-shaped.

12. The rotary hand-held tilling and weed removing device according to claim 10, wherein the first portion of the control handle is slidable along the shaft.

13. The rotary hand-held tilling and weed removing device according to claim 10, wherein the first portion of the control handle is releasably secured between the upper and lower ends of the shaft by a pair of lock collars.

14. The rotary hand-held tilling and weed removing device according to claim 10, wherein the handle comprises nylon.

15. The rotary hand-held tilling and weed removing device according to claim 10, wherein the upper end of the shaft is machined for non-slip attachment to the chuck of said rotary power drill.

* * * * *